United States Patent [19]

Andersson

[11] Patent Number: 4,761,962
[45] Date of Patent: Aug. 9, 1988

[54] PROCESS AND APPARATUS FOR FREEZING LIQUID OR SEMILIQUID FOODS IN THE FORM OF ESSENTIALLY UNIFORM PELLETS

[75] Inventor: Alvar Andersson, Viken, Sweden

[73] Assignee: Frigoscandia Contracting AB, Helsingborg, Sweden

[21] Appl. No.: 62,751

[22] Filed: Jun. 16, 1987

[30] Foreign Application Priority Data

Jun. 16, 1986 [SE] Sweden ............... 8602669

[51] Int. Cl.⁴ .......................................... F25D 13/06
[52] U.S. Cl. .......................................... 62/63; 62/68; 62/74; 62/345; 62/347; 62/374; 62/381
[58] Field of Search ............ 62/63, 68, 345, 347, 62/380, 381, 374, 65, 74, 35

[56] References Cited

U.S. PATENT DOCUMENTS

| | | | |
|---|---|---|---|
| 3,291,076 | 12/1966 | Flanigan et al. | 62/68 |
| 3,436,927 | 4/1969 | Gruber | 62/345 |
| 3,521,458 | 7/1970 | Huibers et al. | 62/35 |
| 3,670,520 | 6/1972 | Bonteil | 62/347 |
| 3,835,657 | 9/1974 | Scudder | 62/35 |
| 4,275,567 | 6/1981 | Schwitters | 62/68 |
| 4,314,451 | 2/1982 | Leeds et al. | 62/68 |
| 4,640,099 | 2/1987 | Gibot | 62/381 |

Primary Examiner—Ronald C. Capossela
Attorney, Agent, or Firm—Browdy and Neimark

[57] ABSTRACT

In a process for freezing liquid or semiliquid food products in the form of essentially uniform pellets, the non-frozen food product is introduced into a container. The product is agitated within the container, while a liquid cooling gas is sprayed over the product. The partially frozen food product is then removed from the container before it is completely frozen and after formability has been achieved, and is formed into essentially uniform pellets which are completely frozen outside the container. An apparatus for carrying the process into effect comprises a container, an agitator mounted within said container, spray nozzles opening into the upper part of the said container for spraying the underlying food product in the container with a liquid cooling gas, a forming device for forming the partially frozen food product removed from said container into essentially uniform pellets, and a freezer for completely freezing the pellets thus formed.

10 Claims, 1 Drawing Sheet

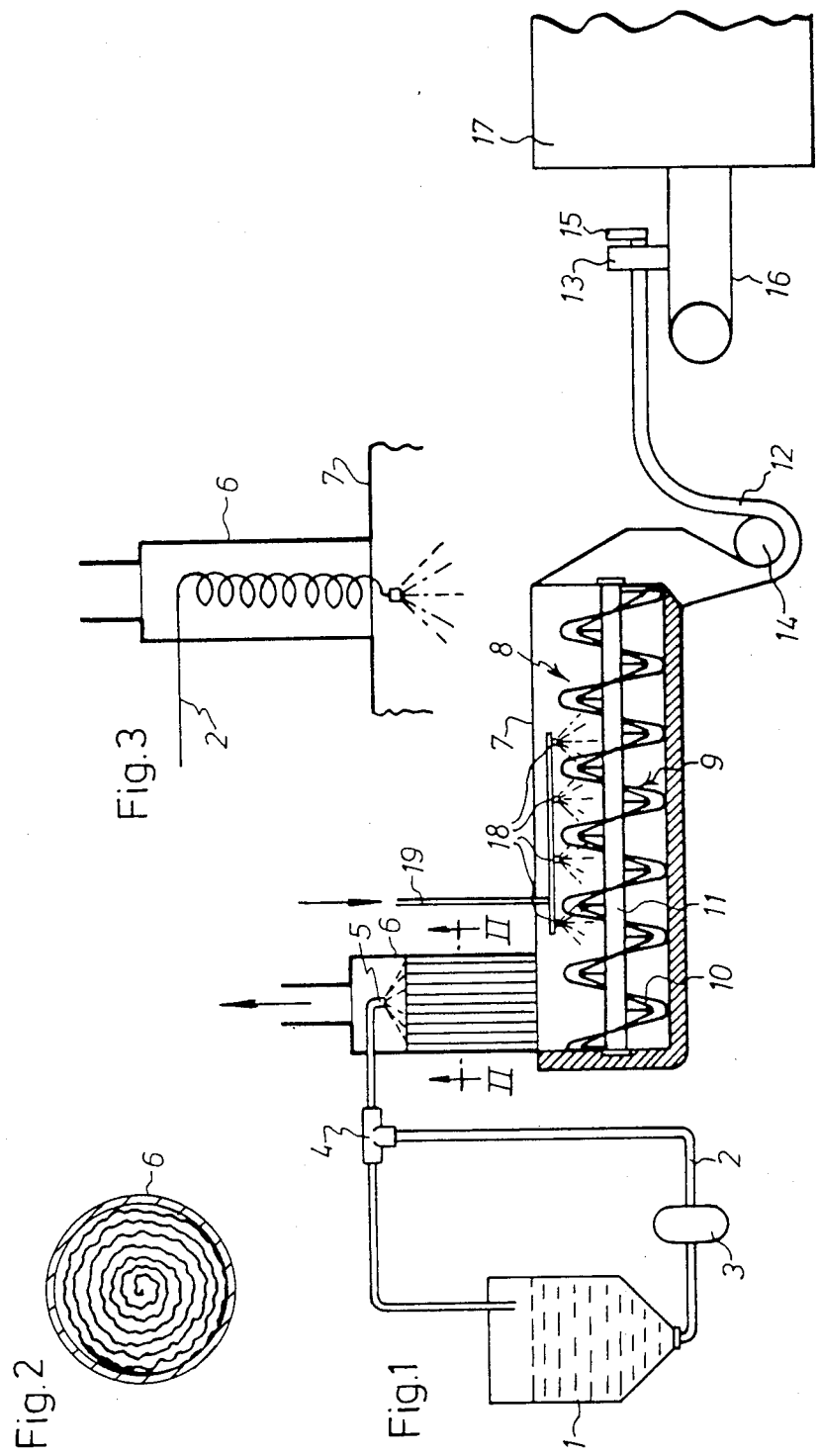

PROCESS AND APPARATUS FOR FREEZING LIQUID OR SEMILIQUID FOODS IN THE FORM OF ESSENTIALLY UNIFORM PELLETS

BACKGROUND OF THE INVENTION

The present invention relates to a process and an apparatus for freezing liquid or semiliquid foods in the form of essentially uniform pellets.

Liquid or semiliquid food products are frequently frozen in block form for subsequent thawing and consumption by catering services and individual households. The disadvantages of this form of freezing are many, for example the quality suffers from the long freezing and thawing times, the user objects to it because optional portioning is not possible, and the fact that the product must be packaged prior to freezing increases the cost. In contrast hereto, the freezing of liquid or semiliquid food products in particulate form, i.e. in the form of powders, granules, pellets or the like, brings several advantages. In this manner, rapid freezing and also rapid thawing is made possible, which is advantageous from the viewpoint of quality. Freezing in particle form enables the producer to simplify packaging in portions of different sizes, while the consumer is able to thaw merely the food quantity he requires at the moment.

Among prior art processes for the freezing liquid and semiliquid food products in particulate form is the process of disposing the product on a cold surface, planar or cylindrical, on which the product is partially or completely frozen, whereupon it is scraped from the surface and sorted according to size prior to packaging, or is formed by compression or extrusion to the desired form prior to packaging. This process suffers from the disadvantage that it is not very gentle toward the product which, if it contains solid particles, may deteriorate both during the scraping and the compression or extrusion.

Another process for freezing liquid or semiliquid food products in particulate form comprises freezing the food in a bath of carbon dioxide snow. By mixing the food with the carbon dioxide snow, the food is made to form granules. The granules resulting from this process are of different sizes, for which reason sorting must be effected prior to packaging. Granules which are too small can be recycled to the process. However, also this process suffers from the disadvantage that it is not sufficiently gentle toward liquid products containing solid particles. Furthermore, it is not possible to obtain uniform particles, and some variation of both the particle size and the particle form must be accepted.

Another process for freezing said food products in particulate form implies freezing the food in containers of desired shape and volume and expelling the food from the containers after freezing. This process is complicated from the viewpoint of production engineering and also suffers from the disadvantage that it is difficult to prevent the product from freezing fast in the containers.

Still another process for freezing the said food products in particulate form includes spreading the product on a conveyor belt which may be planar, corrugated or provided with recesses of a desired shape. The product spread on the belt is conducted thereon through a freezing zone and, after passing through said zone, is separated from the belt. If the belt is formed with recesses, this process has essentially the same shortcomings as the preceding one. If a planar or corrugated belt is used, the product which is rod-shaped or stratified after freezing, must be divided. At least for some products, such treatment is undesirable and, besides, always is accompanied by product waste. Finally, the belt freezing process is unsuitable for products which, in the frozen state, adhere to the belt and thus are difficult to detach therefrom.

SUMMARY

It therefore is the object of the present invention to provide a process and an apparatus for freezing liquid or semiliquid food products in the form of essentially uniform pellets, which process and which apparatus do not suffer from the shortcomings associated with the processes of prior art technique. The process and the apparatus shall satisfy desired quality requirements in respect of rapid freezing, gentle treatment of the product and rapid thawing. Furthermore, the process and the apparatus shall be consumer-conscious by permitting a multiplicity of different pellet forms depending upon the product at issue, but producing pellets of equal size to facilitate portioning. Also, the process and the apparatus must satisfy economic requirements by low waste and flexible packaging technique, and by being able to handle a multiplicity of different products of varying composition, i.e. substantially for all the product lines which are intended to be frozen in pellet form, including such liquid or semiliquid products as contain solid constituents, and by permitting continuous operation.

In the process according to the invention for freezing liquid or semiliquid food products in the form of essentially uniform pellets, these objects are achieved by introducing the nonfrozen food product into a container; agitating the food product within the container while spraying a liquid cooling gas over the food product; removing the partially frozen food product from the container before it is completely frozen and after it has become formable; forming the removed food product into essentially uniform pellets; and completely freezing said pellets outside the container.

The food product preferably is conveyed under agitation from an inlet end to an outlet end, the conveying speed and the amount of liquid cooling gas supplied being adapted such to the conveying distance and the food product at issue that the latter will be formable at the outlet end. The cooling gas gasified by its contact with the food product preferably is conducted away from the container at the inlet end thereof for precooling the product before it is supplied to the inlet end. The cooling gas employed preferably is nitrogen which also serves at a protective gas for the food product during the cooling and agitation thereof.

In an apparatus for freezing liquid or semiliquid food products in the form of essentially uniform pellets, the object of the invention is achieved in that the apparatus is formed with a container, an agitator mounted within said container, spray nozzles opening into the upper part of the said container for spraying the underlying food product in the container with a liquid cooling gas, a forming device for forming the partially frozen food product removed from said container into essentially uniform pellets, and a freezer for completely freezing the pellets thus formed.

The container preferably accommodates a conveyor for conveying the food product from an inlet opening through a region underneath the spraying nozzles to an outlet opening. The agitator proper may be designed such that it serves also as a conveyor. The agitator may then be especially in the form of a screw flight mounted on a central drive shaft in spaced-apart relation thereto.

For efficient utilisation of the cooling gas, a precooler may be provided through which the food product passes in a direction toward the inlet opening of the container, the gasified cooling gas passing in the opposite direction from the inlet opening of said container. To form the partially frozen food product, a pipe preferably is connected to the outlet end of the container, and an extrusion nozzle is mounted in the free end of the said pipe and provided with a cutting device for the production of pellets whose dimensions usually are of the order 1–5 cm, preferably a length of 3–4 cm and a thickness or diameter of 1–2 cm. The normal weight of thes pellets is between 3 and 5 g.

It will be appreciated that the process according to the invention makes it possible to achieve the object referred to above. The liquid cooling gas is finely divided by the spraying and impinges on the food product in the form of very small droplets which efficiently cool the food product within small volumes distributed across the surface of the food product. Due to the agitation of the food product, new parts thereof will constantly be exposed to the spraying, whereby a rapid and essentially simultaneous cooling of the product is achieved. Also due to the agitation, which may be effected at atmospheric pressure and can be made very gentle to the food product, the freezing-out of water and thus the formation of large ice crystals is prevented, simultaneously as the product is maintained homogeneous except for any solid and undivided particles that may occur. To increase the efficiency, the system can instead be made to operate under excess pressure.

The apparatus according to the invention is advantageous in that it permits, in its preferred embodiment, the continuous production of pellets. Moreover, the apparatus requires but little space and can be simply inserted in a production line between equipment for preparing the food product to be frozen in pellet form and a freezer for completely freezing the pellets thus produced.

BRIEF DESCRIPTION OF THE DRAWING

FIG. 1 illustrates schematically an embodiment of an apparatus according to the invention, FIG. 2 is a cross-sectional view of a precooler shown in FIG. 1, and FIG. 3 illustrates an alternative embodiment of the precooler.

DESCRIPTION OF THE PREFERRED EMBODIMENTS

FIG. 1 shows a container 1 for a liquid or semiliquid product to be frozen in pellet form. The product within the container 1 can be discharged therefrom via a conduit 2 by means of a pump 3. The conduit 2 is connected, via a control valve 4, with spray nozzles 5 discharging the product in divided form down into a precooler 6 accommodating a creased rolled-up band, as will appear from FIG. 2.

Also connected to the control valve 4 is a return conduit to the container 1.

The precooler 6 opens into the inlet end of an insulated container 7 accommodating an agitator and conveyor 8. The container 7 is elongate and contains a screw conveyor 9 extending in the longitudinal direction of the container 7 from an inlet end at the precooler 6 to an opposite outlet end. The screw conveyor 9 is formed with at least one screw flight 10 mounted on a central drive shaft 11 in spaced-apart relation thereto. The screw conveyor preferably has two parallel screws each comprising one such screw flight.

From the outlet end of the agitator/conveyor 8 in the container 7 extends a discharge conduit 12 to an extrusion nozzle 13. The product is supplied by means of a pump 14 from the outlet end to the extrusion nozzle 13 which is connected with a cutting device 15 by which pellets are produced and dropped onto a conveyor 16 transferring the pellets into a freezer 17 for final freezing.

The apparatus described above operates as follows. The liquid or semiliquid product is pumped by the pump 3 from the container 1 via the control valve 4 to the nozzles 5. The control valve 4 provides for the requisite volume flow of the product into the precooler 6, the excess being recycled to the container 1 via the return conduit.

In the upper part of the container 7, a plurality of spray nozzles 18 are amounted which preferably are made of sintered metal and supplied, via a conduit 19, with liquid cooling gas, for example liquid nitrogen. The nozzles 18 are such that the liquid cooling gas is sprayed in very finely divided form over the product introduced via the precooler 6 into the agitator/conveyor 8, more particularly into a freezing zone between the inlet and outlet ends of the container 7. In this manner, very small droplets on the liquid cooling gas will be distributed over the surface of the product within the agitator/conveyor 8, whereby the product is rapidly and gently frozen. The simultaneously occurring agitation of the product prevents the formation of larger ice crystals in the product, i.e. the flowability of the product is reduced according as the product is slowly conducted through the agitator/conveyor 8. The cooling gas which gasifies on contact with the product, escapes through the precooler 6 where it encounters the product dripping from the nozzles 5, whereby the product is efficiently precooled prior to its entry into the agitator/conveyor 8. The embodiment of the precooler 6 shown in FIGS. 1 and 2 is preferred for low-viscous products containing no solid particles. For high-viscous products and products containing solid particles, the precooler may instead have the design shown in FIG. 3 where the conduit 2 has been extended helically down through the precooler casing to the nozzles 5.

By suitable control of the conveying speed of the conveyor screw and the amount of cooling gas supplied in liquid form, it is possible to impart to the food product at issue the requisite formability at the outlet end of the conveyor 8. From the outlet end, the now formable food product is supplied through the conduit 12 by means of the pump 14 to the extrusion nozzle 13, and the extruded food product is cut into suitable lengths by means of the cutting device 15 and is deposited on the conveyor 16 which supplies the product in pellet form into the freezer 17 for final freezing.

The requisite formability is such that the formed pellets substantially retain their form during the transport on the conveyor belt 16 into the freezer 17.

The apparatus described above can be modified in several ways within the scope of the invention. Thus, the invention is not restricted to forming by extrusion. The agitator/conveyor especially described is extremely advantageous, but other forms of agitators and conveyors are conceivalbe. Furthermore, cooling gases other than nitrogen may be used, for example carbon dioxide. Finally, the cooling gas, instead of being spread over the food product, as is the preferred technique, may be admixed to the liquid food product directly or in some other suitable manner.

It is claimed:

1. A process for freezing liquid or semiliquid food products in the form of essentially uniform pellets, comprising the steps of introducing the nonfrozen food product into a container; agitating the food product within the container while spraying a liquid cooling gas over the food product; removing the partially frozen food product from the container before it is completely frozen and after it has become formable; forming the removed food product into essentially uniform pellets; and completely freezing said pellets outside the container.

2. A process as claimed in claim 1, wherein the food product is conveyed under agitation from an inlet end to an outlet end, the conveying speed and the amount of liquid cooling gas supplied being adapted such to the conveying distance and the food product at issue that the latter will be formable at the outlet end.

3. A process as claimed in claim 2, wherein the cooling gas gasified upon contact with the food product is conducted away from the container at the inlet end thereof for precooling the product before it is supplied to the inlet end.

4. A process as claimed in claim 1, wherein the cooling gas employed is nitrogen.

5. An apparatus for freezing liquid or semiliquid food products in the form of essentially uniform pellets, comprising a container, an agitator mounted within said container, spray nozzles opening into the upper part of the said container for spraying the underlying food product in the container with a liquid cooling gas, a forming device for forming the partially frozen food product removed from said container into essentially uniform pellets, and a freezer for completely freezing the pellets thus moulded.

6. An apparatus as claimed in claim 5, further comprising a conveyor mounted within the container and adapted to convey the food product from an inlet opening through a region underneath the spraying nozzles to an outlet opening.

7. An apparatus as claimed in claim 6, wherein the agitator is in the form of a conveyor.

8. An apparatus as claimed in claim 7, wherein the agitator comprises a screw flight mounted on a central drive shaft in spaced-apart relation thereto.

9. An apparatus as claimed in claim 6, further comprising a precooler through which the food product is conducted in a direction toward the inlet opening of the container, the gasified cooling gas being conducted in the opposite direction from the container inlet opening.

10. An apparatus as claimed in claim 6, further comprising a pipe connected to the outlet end of the container and an extrusion nozzle mounted in the free end of the said pipe and provided with a cutting device for the production of pellets.

* * * * *